(12) United States Patent
Telford

(10) Patent No.: US 7,776,280 B2
(45) Date of Patent: Aug. 17, 2010

(54) METHOD AND APPARATUS FOR SELECTIVE CATALYTIC REDUCTION OF NOX

(75) Inventor: Clive D. Telford, Lancaster (GB)

(73) Assignee: EMCON Technologies LLC, Wilmington, DE (US)

( * ) Notice: Subject to any disclaimer, the term of this patent is extended or adjusted under 35 U.S.C. 154(b) by 1499 days.

(21) Appl. No.: 11/125,470

(22) Filed: May 10, 2005

(65) Prior Publication Data

US 2006/0257303 A1   Nov. 16, 2006

(51) Int. Cl.
*B01D 50/00* (2006.01)
(52) U.S. Cl. ...................................... 422/172
(58) Field of Classification Search .................. 422/168, 422/180, 182; 60/274, 286, 297
See application file for complete search history.

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,303,552 A | 12/1981 | Ernest et al. |
| 4,339,564 A | 7/1982 | Okamura |
| 4,359,862 A | 11/1982 | Virk et al. |
| 4,372,111 A | 2/1983 | Virk et al. |
| 4,436,793 A | 3/1984 | Adlhart |

(Continued)

FOREIGN PATENT DOCUMENTS

DE     3048540 A1     7/1982

(Continued)

OTHER PUBLICATIONS

Jahn, "Physics of Electric Propulsion", pp. 126-130 (1968).

(Continued)

*Primary Examiner*—Tom Duong
(74) *Attorney, Agent, or Firm*—Pamela A. Kachur

(57) ABSTRACT

An apparatus comprises parallel first and second exhaust gas passageways, a urea injection system, a hydrolysis catalyst, and an SCR catalyst. The urea injection system is configured to inject urea into the first exhaust gas passageway. The hydrolysis catalyst is positioned in the first exhaust gas passageway to generate ammonia at least partially from urea injected into the first exhaust gas passageway by the urea injection system. The SCR catalyst is positioned downstream to reduce NOx with the generated ammonia. An associated method is disclosed.

20 Claims, 2 Drawing Sheets

U.S. PATENT DOCUMENTS

| | | | |
|---|---|---|---|
| 4,451,441 A | 5/1984 | Ernest et al. | |
| 4,458,634 A | 7/1984 | Carr et al. | |
| 4,469,932 A | 9/1984 | Spiegelberg et al. | |
| 4,473,622 A | 9/1984 | Chludzinski et al. | |
| 4,477,417 A | 10/1984 | Domesle et al. | |
| 4,485,621 A | 12/1984 | Wong et al. | |
| 4,515,758 A | 5/1985 | Domesle et al. | |
| 4,516,990 A | 5/1985 | Erdmannsdorfer et al. | |
| 4,522,894 A | 6/1985 | Hwang | |
| 4,535,588 A | 8/1985 | Sato et al. | |
| 4,576,617 A | 3/1986 | Renevot | |
| 4,578,955 A | 4/1986 | Medina | |
| 4,625,511 A | 12/1986 | Scheitlin et al. | |
| 4,625,681 A | 12/1986 | Sutekiyo | |
| 4,645,521 A | 2/1987 | Freesh | |
| 4,651,524 A | 3/1987 | Brighton | |
| 4,657,829 A | 4/1987 | McElroy et al. | |
| 4,670,233 A | 6/1987 | Erdmannsdoerfer et al. | |
| 4,720,376 A | 1/1988 | Laue et al. | |
| 4,720,972 A | 1/1988 | Rao et al. | |
| 4,759,918 A | 7/1988 | Homeier et al. | |
| 4,828,807 A | 5/1989 | Domesle et al. | |
| 4,830,492 A | 5/1989 | Ko | |
| 4,841,925 A | 6/1989 | Ward | |
| 4,849,274 A | 7/1989 | Cornelison | |
| 4,902,487 A | 2/1990 | Cooper et al. | |
| 4,928,227 A | 5/1990 | Burba et al. | |
| 4,963,792 A | 10/1990 | Parker | |
| 4,967,118 A | 10/1990 | Urataki et al. | |
| 5,095,247 A | 3/1992 | Hanamura | |
| 5,138,959 A | 8/1992 | Kulkarni | |
| 5,143,025 A | 9/1992 | Munday | |
| 5,159,900 A | 11/1992 | Damman | |
| 5,205,912 A | 4/1993 | Murphy | |
| 5,207,185 A | 5/1993 | Greiner et al. | |
| 5,212,431 A | 5/1993 | Origuchi et al. | |
| 5,228,529 A | 7/1993 | Rosner | |
| 5,272,871 A | 12/1993 | Oshima et al. | |
| 5,284,503 A | 2/1994 | Bitler et al. | |
| 5,293,743 A | 3/1994 | Usleman et al. | |
| 5,317,996 A | 6/1994 | Lansing | |
| 5,345,762 A | 9/1994 | Lutze | |
| 5,362,939 A | 11/1994 | Hanus et al. | |
| 5,365,733 A | 11/1994 | Takeshima et al. | |
| 5,409,784 A | 4/1995 | Bromberg et al. | |
| 5,409,785 A | 4/1995 | Nakano et al. | |
| 5,412,946 A | 5/1995 | Oshima et al. | |
| 5,425,332 A | 6/1995 | Rabinovich et al. | |
| 5,437,250 A | 8/1995 | Rabinovich et al. | |
| 5,441,401 A | 8/1995 | Yamaguro et al. | |
| 5,445,841 A | 8/1995 | Arendt et al. | |
| 5,451,740 A | 9/1995 | Hanus et al. | |
| 5,560,890 A | 10/1996 | Berman et al. | |
| 5,586,433 A | 12/1996 | Boegner et al. | |
| 5,599,758 A | 2/1997 | Guth et al. | |
| 5,660,602 A | 8/1997 | Collier, Jr. et al. | |
| 5,666,923 A | 9/1997 | Collier, Jr. et al. | |
| 5,746,989 A | 5/1998 | Murachi et al. | |
| 5,787,706 A | 8/1998 | Smedler et al. | |
| 5,787,864 A | 8/1998 | Collier, Jr. et al. | |
| 5,813,222 A | 9/1998 | Appleby | |
| 5,826,548 A | 10/1998 | Richardson, Jr. | |
| 5,832,722 A | 11/1998 | Cullen et al. | |
| 5,845,485 A | 12/1998 | Murphy et al. | |
| 5,847,353 A | 12/1998 | Titus et al. | |
| 5,852,927 A | 12/1998 | Cohn et al. | |
| 5,863,413 A | 1/1999 | Caren et al. | |
| 5,887,554 A | 3/1999 | Cohn et al. | |
| 5,894,725 A | 4/1999 | Cullen et al. | |
| 5,910,097 A | 6/1999 | Boegner et al. | |
| 5,921,076 A | 7/1999 | Krutzch et al. | |
| 5,934,069 A | 8/1999 | Hertl et al. | |
| 5,946,906 A | 9/1999 | Akazaki et al. | |
| 5,974,791 A | 11/1999 | Hirota et al. | |
| 6,012,284 A | 1/2000 | Tanaka et al. | |
| 6,012,326 A | 1/2000 | Raybone et al. | |
| 6,014,593 A | 1/2000 | Grufman | |
| 6,038,853 A | 3/2000 | Penetrante et al. | |
| 6,038,854 A | 3/2000 | Penetrante et al. | |
| 6,047,543 A | 4/2000 | Caren et al. | |
| 6,048,500 A | 4/2000 | Caren et al. | |
| 6,082,102 A | 7/2000 | Wissler et al. | |
| 6,122,909 A | 9/2000 | Murphy et al. | |
| 6,125,629 A | 10/2000 | Patchett | |
| 6,130,260 A | 10/2000 | Hall et al. | |
| 6,134,882 A | 10/2000 | Huynh et al. | |
| 6,152,118 A | 11/2000 | Sasaki et al. | |
| 6,153,162 A | 11/2000 | Fetzer et al. | |
| 6,170,259 B1 | 1/2001 | Boegner et al. | |
| 6,176,078 B1 | 1/2001 | Balko et al. | |
| 6,182,445 B1 | 2/2001 | Yamazaki et al. | |
| 6,193,942 B1 | 2/2001 | Okuda et al. | |
| 6,199,372 B1 | 3/2001 | Wakamoto | |
| 6,235,254 B1 | 5/2001 | Murphy et al. | |
| 6,248,684 B1 | 6/2001 | Yavuz et al. | |
| 6,284,157 B1 | 9/2001 | Eliasson et al. | |
| 6,287,527 B1 | 9/2001 | Kawanami et al. | |
| 6,294,141 B1 | 9/2001 | Twigg et al. | |
| 6,311,232 B1 | 10/2001 | Cagle et al. | |
| 6,321,533 B1 | 11/2001 | Watanabe et al. | |
| 6,322,757 B1 | 11/2001 | Cohn et al. | |
| 6,327,852 B1 | 12/2001 | Hirose | |
| 6,334,306 B1 | 1/2002 | Mori et al. | |
| 6,363,716 B1 | 4/2002 | Balko et al. | |
| 6,397,586 B1 | 6/2002 | Sakurai et al. | |
| 6,422,006 B2 | 7/2002 | Ohmori et al. | |
| 6,560,958 B1 | 5/2003 | Bromberg et al. | |
| 6,845,610 B2 | 1/2005 | Shiino | |
| 6,871,489 B2 | 3/2005 | Tumati et al. | |
| 2002/0012618 A1 | 1/2002 | Bromberg et al. | |
| 2002/0194835 A1 | 12/2002 | Bromberg et al. | |
| 2003/0209011 A1* | 11/2003 | Duvinage et al. | 60/286 |
| 2004/0057887 A1 | 3/2004 | Sun et al. | |
| 2004/0067177 A1 | 4/2004 | Thieman et al. | |
| 2004/0258594 A1 | 12/2004 | Andreasson et al. | |

FOREIGN PATENT DOCUMENTS

| | | |
|---|---|---|
| DE | 3337903 A1 | 5/1985 |
| DE | 237120 A1 | 7/1986 |
| DE | 19510804 A1 | 9/1996 |
| DE | 19644864 A1 | 5/1998 |
| DE | 19757936 A1 | 7/1999 |
| DE | 19927518 A1 | 1/2001 |
| EP | 0096538 B1 | 12/1983 |
| EP | 0153116 A2 | 8/1985 |
| EP | 0382434 A2 | 8/1990 |
| EP | 0485922 A1 | 5/1992 |
| EP | 0891806 A2 | 1/1999 |
| EP | 0891806 A3 | 4/1999 |
| EP | 1057998 A1 | 5/2000 |
| EP | 1013902 A2 | 6/2000 |
| EP | 1030395 A2 | 8/2000 |
| EP | 1013902 A3 | 1/2003 |
| EP | 1400665 A1 | 3/2004 |
| FR | 2593493 A1 | 7/1987 |
| FR | 2620436 A1 | 3/1989 |
| GB | 355210 | 2/1930 |
| GB | 1014498 | 12/1965 |
| GB | 1221317 | 2/1971 |
| GB | 2188559 A | 10/1987 |
| GB | 2241746 A | 9/1991 |
| JP | 54-74419 | 6/1979 |
| JP | 02121300 A2 | 5/1990 |

| | | |
|---|---|---|
| JP | 03195305 | 8/1991 |
| JP | 5127630 A2 | 5/1993 |
| JP | 05231242 A2 | 9/1993 |
| JP | 07292372 A2 | 11/1995 |
| JP | 9079024 A2 | 3/1997 |
| SU | 1519762 A1 | 11/1989 |
| WO | WO 85/00159 A1 | 1/1985 |
| WO | WO 94/03263 A1 | 2/1994 |
| WO | WO 95/06194 A1 | 3/1995 |
| WO | WO 96/24441 A2 | 8/1996 |
| WO | WO 96/27078 A1 | 9/1996 |
| WO | WO 98/45582 A1 | 10/1998 |
| WO | WO 00/26518 A1 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Belogub et al., "Petrol-Hydrogen Truck With Load-Carrying Capacity 5 Tons", Int. J. Hydrogen Energy, vol. 16, No. 6, pp. 423-426 (1991).

Breshears et al., "Partial Hydrogen Injection Into Internal Combustion Engines", Proceedings of the EPA 1$^{st}$ Symposium on Low Pollution Power Systems and Development, pp. 268-277 (Oct. 1973).

Chuveliov et al., "Comparison of Alternative Energy Technologies Utilizing Fossil Fuels and Hydrogen Based on Their Damage to Population and Environment in the USSR and East Europe", pp. 269-300.

Correa, "Lean Premixed Combustion for Gas-Turbines: Review and Required Research", PD-vol. 33, Fossil Fuel Combustion, ASME, pp. 1-9 (1991).

Czernichowski et al., "Multi-Electrodes High Pressure Gliding Discharge Reactor and its Applications for Some Waste Gas and Vapor Incineration", pp. 1-13 (1990).

Das, "Exhaust Emission Characterization of Hydrogen-Operated Engine System: Nature of Pollutants and their Control Techniques", Int. J. Hydrogen Energy, vol. 16, No. 11, pp. 765-775 (1991).

Das, "Hydrogen Engines: A View of the Past and a Look into the Future", Int. J. of Hydrogen Energy, vol. 15, No. 6, pp. 425-443 (1990).

Das, "Fuel Induction Techniques for a Hydrogen Operated Engine", Int. J. of Hydrogen Energy, vol. 15, No. 11, pp. 833-842 (1990).

DeLuchi, "Hydrogen Vehicles: An Evaluation of Fuel Storage, Performance, Safety, Environmental Implants and Cost", Int. J. Hydrogen Energy, vol. 14, No. 2, pp. 81-130 (1989).

Duclos et al., "Diagnostic Studies of a Pinch Plasma Accelerator", AIAA Journal, vol. 1, No. 11, pp. 2505-2513 (Nov. 1963).

Feucht et al., "Hydrogen Drive for Road Vehicles—Results from the Fleet Test Run in Berlin", Int. J. Hydrogen Energy, vol. 13, No. 4, pp. 243-250 (1988).

Finegold et al., "Dissociated Methanol as a Consumable Hydride for Automobiles and Gas Turbines", Proceedings of the 4$^{th}$ World Hydrogen Energy Conference, vol. 3, pp. 1359-1369 (Jun. 13-17, 1982).

Hall et al., "Initial Studies of a New Type of Ignitor: The Railplug"—Paper 912319, pp. 1730-1746 (1991).

Houseman et al., "Hydrogen Engines Based on Liquid Fuels, A Review", G.E., Proc., 3$^{rd}$ World Hydrogen Energy Conf., pp. 949-968 (1980).

Houseman, et al., "Two Stage Combustion for Low Emissions Without Catalytic Converters", Society of Automobile Engineering Meeting, SAE Paper 760759, pp. 1-9 (Oct. 18-22, 1976).

Jones, et al., "Exhaust-Gas Reforming of Hydrocarbon Fuels", Society of Automotive Engineers, Paper 931086, pp. 223-234 (1993).

Kaske et al., "Hydrogen Production by the Hüls Plasma-Reforming Process", Hydrogen Energy Progress VI, Proceedings of the 6th World Hydrogen Energy Conference, vol. 1, pp. 185-190 (Jul. 20-24, 1986).

MacDonald, "Evaluation of Hydrogen-Supplemented Fuel Concept with an Experimental Multi-Cylinder Engine", Society of Automotive Engineers, Paper 760101, pp. 1-16 (Feb. 23-27, 1976).

Mackay, "Development of a 24 kW Gas Turbine-Driven Generator Set for Hybrid Vehicles", Paper 940510, pp. 99-105, NoMac Energy Systems, Inc.

Mackay, "Hybrid Vehicle Gas Turbines", Paper 930044, NoMac Energy Systems, Inc., pp. 35-41.

Matthews et al., "Further Analysis of Railplugs as a New Type of Ignitor", Paper 922167, pp. 1851-1862 (1992).

Mishchenko et al., "Hydrogen as a Fuel for Road Vehicles", Proc. VII World Hydrogen Energy Conference, vol. 3, pp. 2037-2056 (1988).

Monroe et al., "Evaluation of a Cu/Zeolite Catalyst to Remove $NO_x$ from Lean Exhaust", Society of Automotive Engineers, Paper 930737, pp. 195-203 (1993).

Rabinovich et al., "On Board Plasmatron Generation of Hydrogen-Rich Gas for Engine Pollution Reduction", Proceedings of NIST Workshop on Advanced Components for Electric and Hybrid Electric Vehicles, pp. 83-88 (Oct. 1993) (not published).

Rabinovich et al., "Plasmatron Internal Combustion Engine System for Vehicle Pollution Reduction", Int. J. of Vehicle Design, vol. 15, Nos. 3/4/5, pp. 234-242 (1994).

Scott et al., "Hydrogen Fuel Breakthrough with On-Demand Gas Generator", 372 Automotive Engineering, vol. 93, No. 8, pp. 81-84 (Aug. 1985).

Shabalina et al., "Slag Cleaning by Use of Plasma Heating", pp. 1-7. Handbook of Thermodynamic High Temperature Process Data, "Conversion of Hydrocarbons and Production of Reducing Gases in the C-H-O and C-H-O-N. Systems", Chapter Nine, pp. 507-547.

Varde et al., "Reduction of Soot in Diesel Combustion with Hydrogen and Different H/C Gaseous Fuels", Hydrogen Energy Progress V, pp. 1631-1639.

Wang et al., "Emission Control Cost-Effectiveness of Alternative-Fuel Vehicles", Society of Automotive Engineers, Paper 931786, pp. 91-122 (1993).

Wilson, "Turbine Cars", Technology Review, pp. 50-56 (Feb./Mar. 1995).

Kirwan et al., "Fast Start-Up On-Board Gasoline Reformer for Near Zero Emissions in Spark-Ignition Engines", Society of Automotive Engineers 2002 World Congress, Paper No. 2002-01-1011, 14 pgs. (Mar. 4-7, 2002).

Kirwan et al., "Development of a Fast Start-up O Gasoline Reformer for Near Zero Spark-Ignition Engines", Delphi Automotive Systems, pp. 1-21 (2001).

Chandler, "Device May Spark Clean-Running Cars", The Boston Globe, p. E1, 2 pgs. (Jul. 12, 1999).

Simanaitis, "Whither the Automobile?", Road and Track, pp. 98-102 (Sep. 2001).

Shelef et al., "Twenty-five Years after Introduction of Automotive Catalysts: What Next?" Catalysis Today 62, pp. 35-50 (2000).

Stokes et al., "A Gasoline Engine Concept for Improved Fuel Economy—The Lean Boost System", International Falls Fuels and Lubricants Meeting and Exposition, SAE Technical Paper Series, 14 pgs. (Oct. 16-19, 2000).

Tachtler et al., "Fuel Cell Auxiliary Power Unit—Innovation for the Electric Supply of Passenger Cars?", Society of Automotive Engineers, Paper No. 2000-01-0374, pp. 109-117 (2000).

Bromberg et al., "Experimental Evaluation of SI Engine Operation Supplemented by Hydrogen Rich Gas from a Compact Plasma Boosted Reformer", Massachusetts Institute of Technology Plasma Science and Fusion Center Report, JA-99-32, 9 pgs. (1999).

Bromberg et al., "Compact Plasmatron-Boosted Hydrogen Generation Technology for Vehicular Applications", Int. J. of Hydrogen Energy 24, pp. 341-350 (1999).

Bromberg et al., "Emissions Reductions Using Hydrogen from Plasmatron Fuel Converters", Int. J. of Hydrogen Energy 26, pp. 1115-1121 (2001).

Burch et al., "An Investigation of the $NO/H_2/O_2$ Reaction on Noble-Metal Catalysts at Low Temperatures Under Lean-Burn Conditions," Applied Catalysis B: Environmental 23, pp. 115-121 (1999).

Costa et al., "An Investigation of the $NO/H_2/O_2$ (Lean De-$No_x$) Reaction on a Highly Active and Selective $Pt/La_{0.7}Sr_{0.2}Ce_{0.1}FeO_3$ Catalyst at Low Temperatures", Catalysis 209, pp. 456-471 (2002).

Frank et al., "Kinetics and Mechanism of the Reduction of Nitric Oxides by $H_2$ Under Lean-Burn Conditions on a Pt-Mo-Co/ά-$Al_2O_3$ Catalyst", Applied Catalysis B: Environmental 19, pp. 45-57 (1998).

Gore, "Hydrogen A Go-Go", Discover, pp. 92-93, (Jul. 1999).

Koebel et al., "Selective Catalytic Reduction of NO and $NO_2$ at Low Temperatures", Catalysis Today 73, pp. 239-247 (2002).

Nanba et al., "Product Analysis of Selective Catalytic Reduction of $NO_2$ with $C_2H_4$ Over H-Ferrierite", Journal of Catalysis 211, pp. 53-63 (2002).

Sun et al., "Small Scale Test Results From New Selective Catalytic NOx Reduction Process Using Urea", MEGA Symposium, pp. 1-6; (Aug. 20, 2001).

Weber et al., "Selective Catalytic Reduction for Diesel Engines in Stationary Power and Transportation Applications", Abstract of a Paper submitted for the 2003 Conference on Selective Catalytic Reduction and Non-Catalytic Reductions for NOx Control, Pittsburgh, (Oct. 29-30, 2003) (2 pages).

Helden et al., "Engine Dynamometer and Vehicle Performance of a Urea SCR-System for Heavy-Duty Truck Engines", *2002 Society of Automotive Engineers, Inc.* pp. 1-9, (2002-01-0286) (2002).

"Response by AECC to European Commission Call for Evidence on the technology potential of achieving the 2.0 g/kWh limit for oxides of nitrogen (NOx) due for applications from 2008, as laid down in Directive 1999/96/EC", *Association for Emissions Control by Catalyst*, pp. 1-19, (Aug. 2002).

"Exhaust Gas Aftertreatment Group—Selective Catalytic Reduction", Paul Scherrer Institute (Nov. 4, 2002) (2 pages).

"Exhaust Gas Aftertreatement Group—Heterogeneouss Catalytic Hydrolysis of Urea in the Gas Phase", Paul Scherrer Institute (Nov. 4, 2002) (1 page).

European Search Report and Annex thereto, Oct. 30, 2003, EPX.

M. R. Jones and M. L. Wyszynski, "Exhaust-Gas Reforming of Hydrocarbon Fuels," SAE 931096, pp. 223-234 (1993).

PCT Search Report for International Patent Application No. PCT/US06/17657, Aug. 2, 2007, 9 pgs.

\* cited by examiner

METHOD AND APPARATUS FOR SELECTIVE CATALYTIC REDUCTION OF NOX

FIELD OF THE DISCLOSURE

The present disclosure relates generally to removal of NOx from exhaust gas.

BACKGROUND OF THE DISCLOSURE

There are a number of ways to remove NOx (i.e., oxides of nitrogen) from exhaust gas of an engine. One way is to use selective catalytic reduction. In particular, a selective catalytic reduction catalyst (i.e., an SCR catalyst) positioned in an exhaust gas stream causes a reaction between NOx present in the exhaust gas and a NOx-reducing agent (e.g., ammonia) to reduce and thus remove the NOx from the exhaust gas.

SUMMARY OF THE DISCLOSURE

According to an aspect of the present disclosure, an apparatus comprises parallel first and second exhaust gas passageways, a urea injection system, a hydrolysis catalyst, and an SCR catalyst. The urea injection system is configured to inject urea into the first exhaust gas passageway. The hydrolysis catalyst is positioned in the first exhaust gas passageway to generate ammonia at least partially from urea injected into the first exhaust gas passageway by the urea injection system. The SCR catalyst is positioned downstream to reduce NOx with the generated ammonia. An associated method is disclosed.

The above and other features of the present disclosure will become apparent from the following description and the attached drawings.

DETAILED DESCRIPTION OF THE DRAWINGS

Figure 1:
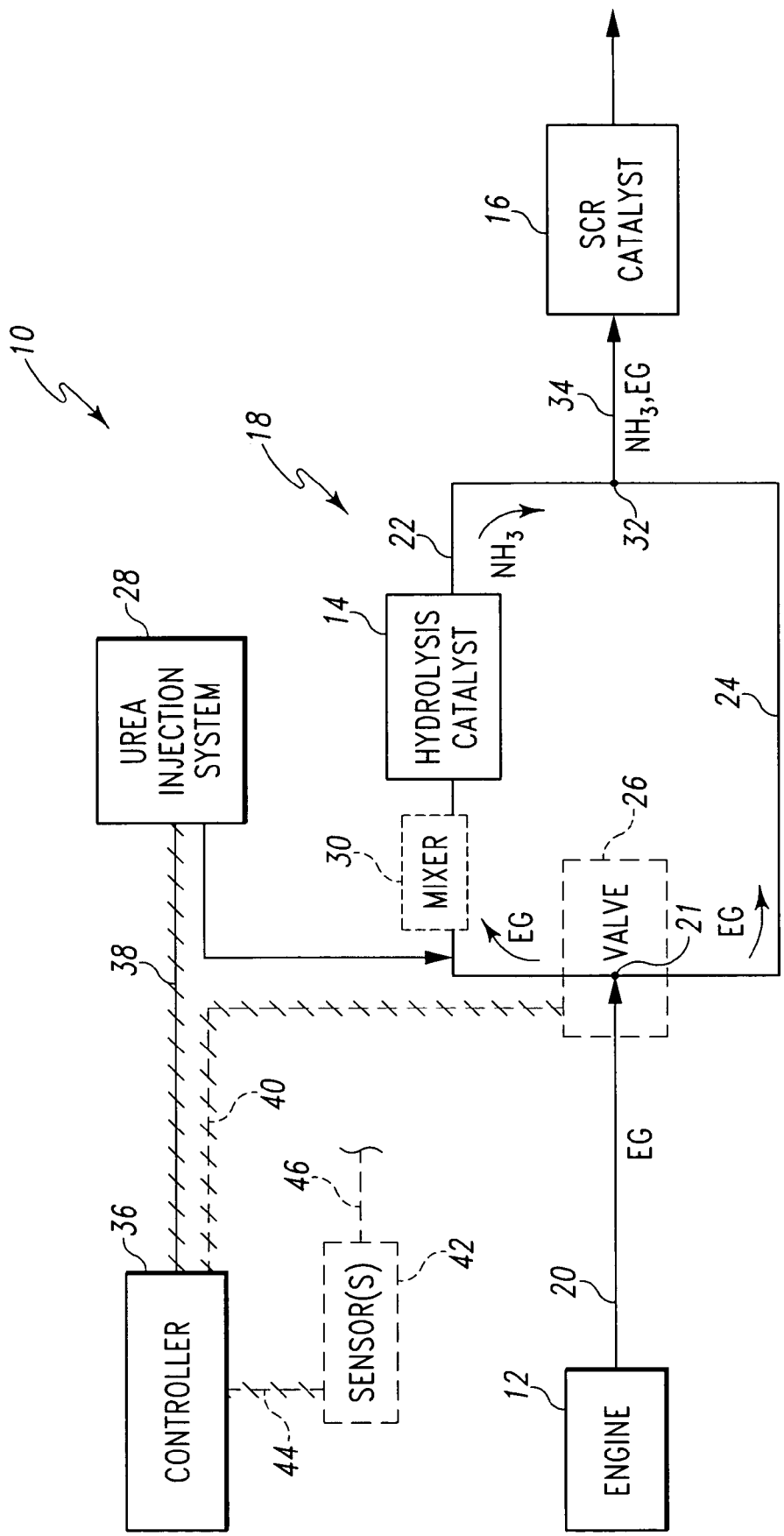
FIG. 1 is a simplified block diagram showing an apparatus with a hydrolysis catalyst for generating ammonia at least partially from urea to reduce NOx with the ammonia at an SCR catalyst.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an apparatus 10 configured to decompose urea $[CO(NH_2)_2]$ to generate ammonia $(NH_3)$ for selective catalytic reduction of NOx present in exhaust gas ("EG" in the drawings) of an internal combustion engine 12. To do so, a hydrolysis catalyst 14 positioned in an exhaust gas sidestream in parallel with a main flow of exhaust gas catalyzes a hydrolysis reaction to decompose urea injected into the sidestream into ammonia according to the following general statement of the hydrolysis reaction: $CO(NH_2)_2+H_2O \rightarrow 2NH_3+CO_2$. The water $(H_2O)$ may be present in the exhaust gas as a product of combustion from the engine 12 and/or may be present in the exhaust gas as a result of some other mechanism such as by injection of aqueous urea into the sidestream. The ammonia is then advanced to a downstream SCR catalyst 16 which catalyzes a reaction between the ammonia and NOx present in the exhaust gas to chemically reduce the NOx.

A parallel flow arrangement 18 is positioned fluidly between the engine 12 and the SCR catalyst 16. An exhaust gas supply passageway 20 fluidly coupled to and positioned fluidly between the engine 12 and the arrangement 18 supplies an exhaust gas stream of the engine 12 to the arrangement 18. The supply passageway 20 divides at an upstream location 21 into parallel first and second exhaust gas passageways 22, 24 of the arrangement 18 so that a portion of the exhaust gas stream flows into the first exhaust gas passageway 22 as a sidestream of exhaust gas and a portion of the exhaust gas stream flows into the second exhaust gas passageway 24 as a main flow of exhaust gas.

An optional exhaust gas valve 26 may be used with the parallel flow arrangement 18 to control flow of exhaust gas from the supply passageway 20 to the first and second exhaust gas passageways 22, 24. In such a case, the valve 26 may take a variety of forms. For example, it may be a 3-way diverter valve positioned at the junction between the supply passageway 20 and the first and second exhaust gas passageways 22, 24. In other examples, it may be a butterfly valve positioned in one of the first and second exhaust gas passageways 22, 24.

A urea injection system 28 is fluidly coupled to the first exhaust gas passageway 22 but not to the second exhaust gas passageway 24. The urea injection system 28 is configured to inject urea (e.g., aqueous urea comprising water and about 32% urea) into the first exhaust gas passageway 22 at an injection location upstream from the hydrolysis catalyst 14 which is positioned in the first exhaust gas passageway 22. The urea dispenser of the system 26 may take a variety of forms such as any of a single urea injector, a plurality of urea injectors, and an annular urea injector.

The heat content of the exhaust gas in the first exhaust gas passageway 22 may be sufficient to vaporize some or all of the injected urea to facilitate mixing of the urea in the exhaust gas. Such mixing promotes distribution of the urea at the inlet face of the hydrolysis catalyst 14 to thereby promote generation of ammonia.

An optional mixer 30 may be positioned in the first exhaust gas passageway 22 fluidly between the urea injection location and the hydrolysis catalyst 14. In such a case, the mixer 30 is used to further promote mixing of urea in the exhaust gas before the urea arrives at the hydrolysis catalyst 14.

The hydrolysis catalyst 14 is positioned in the first exhaust gas passageway 22 to generate ammonia at least partially from the urea injected into the passageway 22 by the urea injection system 28. In some cases, the entire urea decomposition process may occur at the hydrolysis catalyst 14. In other cases, the heat content of the exhaust gas in the first exhaust gas passageway 22 may be sufficient to begin thermolytic decomposition of the urea into isocyanic acid (HNCO) upon injection of the urea into the exhaust gas. In such a case, the HNCO may then be mixed with exhaust gas by the mixer 30 and hydrolyzed into ammonia at the hydrolysis catalyst 14 to complete generation of ammonia. Regardless of the exact mechanism for decomposing the urea, ammonia is generated by use of the urea and the hydrolysis catalyst 14.

The hydrolysis catalyst 14 may be configured to force mixing of the flow therein. In particular, the hydrolysis may be formed without defined channels. For example, the hydrolysis catalyst 14 may be a ceramic foam catalyst or metal catalyst designed for turbulent flow.

The first and second exhaust gas passageways 22, 24 recombine at a downstream location 32 into a downstream exhaust gas passageway 34. Ammonia from the first exhaust gas passageway 22 and exhaust gas from the second exhaust gas passageway 24 flow into the downstream exhaust gas passageway 34.

The SCR catalyst 16 is positioned in the downstream exhaust gas passageway 34. The SCR catalyst 16 is configured to selectively catalyze a reaction between the ammonia and NOx present in the exhaust gas to chemically reduce the NOx and thus remove the NOx from the exhaust gas. It is "selective" in the sense of its affinity for reacting ammonia with NOx rather than ammonia with oxygen that may be present in the exhaust gas (e.g., diesel exhaust gas).

A controller 36 is used to control operation of the urea injection system 28 and/or the exhaust gas valve 26 (if included). The controller 36 is electrically coupled to the urea injection system 28 via an electrical line 38 and, when the valve 26 is included, it is electrically coupled to the valve 26 via an electrical line 40. The controller 36 is thus able to vary the injection rate of urea into the passageway 22 and/or vary flow of exhaust gas and any water present in the exhaust gas from combustion into the passageway 22.

To facilitate control of the urea injection system 28 and/or the valve 26, the controller 36 may receive input(s) from a number of sensor(s) 42 over an electrical line 44 and/or may use an engine map associated with the engine 12 and stored in controller 36. Such sensor(s) 42 may include a NOx sensor, an ammonia sensor, and/or a flow rate sensor coupled to any one or more of passageways 20, 22, 24, 34 or other location via a line 46. In the case where an engine map is employed, the sensor(s) may be configured to sense engine operational parameters (e.g., engine rpm, temperature, throttle position) and provide such information to the controller 36. In such a case, the sensor line 46 may be coupled to the engine 12 or one or more components associated therewith. Thus, the controller 36 may be configured to control operation of the urea injection system 28 and/or the valve 26 in response to at least one of an engine map associated with the engine 12 and operation of the at least one sensor 42.

Figure 2:
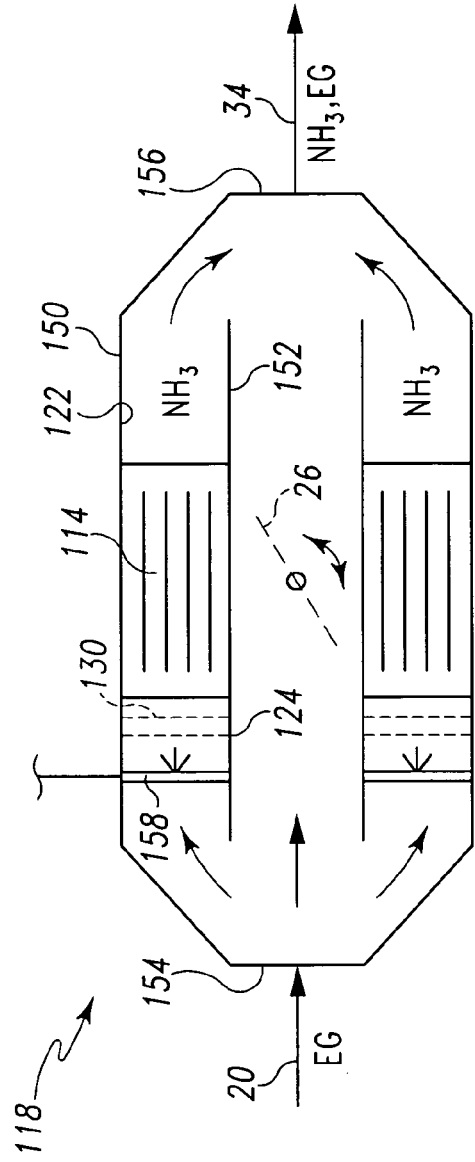
FIG. 2 is a diagrammatic view showing the hydrolysis catalyst positioned in an exhaust gas passageway of a first parallel flow arrangement.

Referring to FIG. 2, there is shown a parallel flow arrangement 118 for use as the parallel flow arrangement 18 in the apparatus 10. The arrangement 118 has a housing 150 and an inner tube 152 mounted in the housing 150. The housing 150 has an inlet port 154 that receives exhaust gas from the exhaust gas supply passageway 20 and an outlet port 156 that discharges exhaust gas and ammonia to the downstream exhaust gas passageway 34.

An annular outer exhaust gas passageway 122 corresponding to the first exhaust gas passageway 22 is defined between the housing 150 and the inner tube 152. The passageway 122 contains the hydrolysis catalyst 114 which has an annular shape to fit in the passageway 122. A urea dispenser 158 for use with the system 28 is secured to the housing 150 and the inner tube 152 to dispense urea into the passageway 122. Illustratively, the urea dispenser 158 is ring-shaped and has a plurality of injectors spaced about the tube 152. It is within the scope of this disclosure for the dispenser 158 to be a single injector. An optional annular mixer 130 for mixing the injected urea and/or a decomposition product thereof (e.g., HNCO) may be positioned fluidly between the dispenser 158 and the hydrolysis catalyst 114.

The inner tube 152 defines an inner exhaust gas passageway 124 corresponding to the second exhaust gas passageway 24 of the system 10 to conduct exhaust gas so as to bypass the hydrolysis catalyst 114. The optional valve 26 may be configured, for example, as a butterfly valve positioned in the inner exhaust gas passageway 124 to control flow of exhaust gas to the passageways 122, 124.

Figure 3:
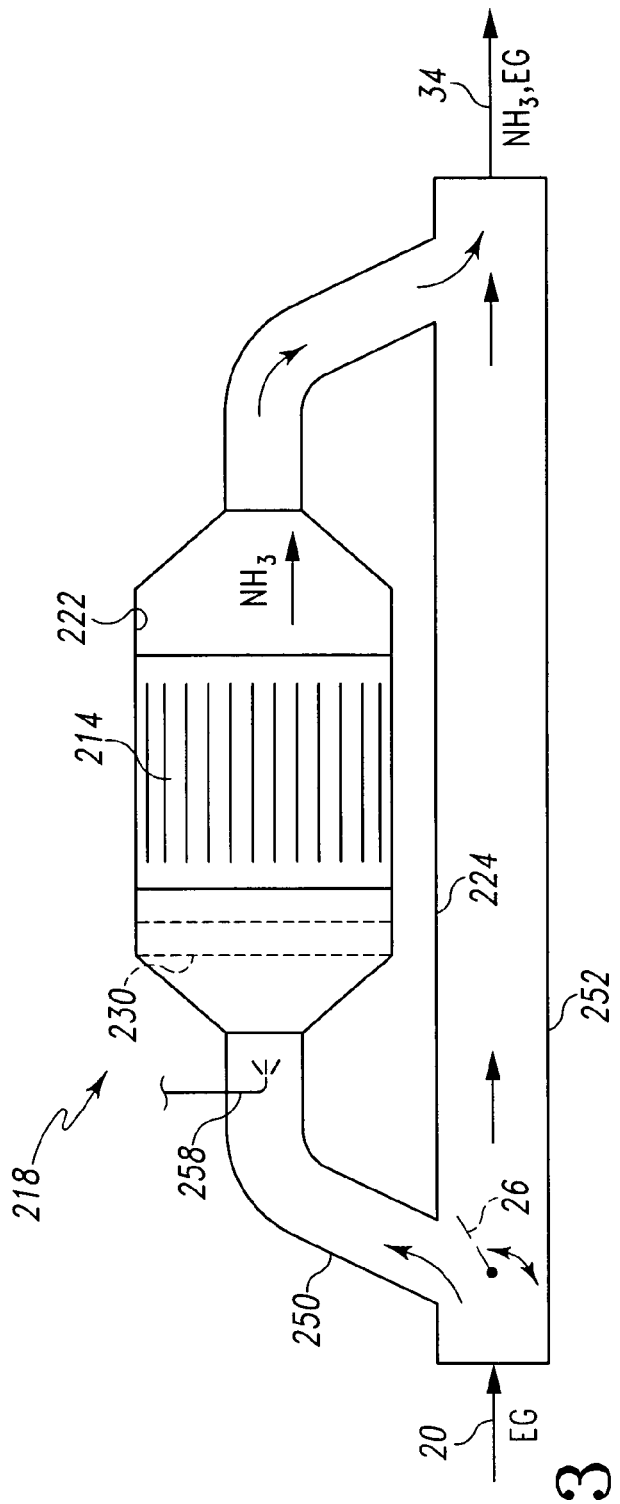
FIG. 3 is a diagrammatic view showing the hydrolysis catalyst positioned in an exhaust gas passageway of a second parallel flow arrangement.

Referring to FIG. 3, there is shown a parallel flow arrangement 218 for use as the parallel flow arrangement 18 in the system 10. The arrangement 218 has a first conduit 250 and a second conduit 252. The conduits 250, 252 are secured to one another at upstream and downstream locations and extend between such locations outside of one another.

Exhaust gas is divided at the upstream location to flow into a first exhaust gas passageway 222 corresponding to the passageway 22 of the system 10 and a second exhaust gas passageway 224 corresponding to the passageway 24 of the system 10. A hydrolysis catalyst 214 is positioned in the first exhaust gas passageway 222 to generate ammonia at least partially from urea injected into the passageway 222 by a urea dispenser 258 configured, for example, as a single urea injector secured to the first conduit 250. An optional mixer 230 for mixing the injected urea and/or a decomposition product thereof (e.g., HNCO) may be positioned fluidly between the dispenser 258 and the hydrolysis catalyst 214.

The optional valve 26 may be configured, for example, as a butterfly valve positioned in either passageway 222, 224 to control flow of exhaust gas to the passageways 222, 224. Illustratively, the valve 26 is located in the passageway 224.

Decomposing urea by use of a hydrolysis catalyst in a sidestream may provide one or more of a number of benefits. First, use of a large (and more costly) hydrolysis catalyst through which all the exhaust gas flows can be avoided. As a result, back pressure on the engine 12 is reduced, thereby promoting engine power and economy. Second, lower space velocities in the hydrolysis catalyst (i.e., higher residence time of the flow in the hydrolysis catalyst) can be achieved. Third, urea is rapidly decomposed to ammonia which will react at a lower temperature on the SCR catalyst, thus increasing the working range of the SCR catalyst on vehicles. Fourth, the potential for forming flow-blocking solid materials (e.g., solid polymerization and decomposition products may form in the reactor from urea) can be reduced in the exhaust gas. Fifth, a smaller (and thus cheaper) SCR catalyst can be used. Sixth, good performance from a combination of an SCR catalyst and one or more filters may be more readily achievable.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. An apparatus, comprising:
parallel first and second exhaust gas passageways, a urea injection system configured to inject urea into the first exhaust gas passageway,
a hydrolysis catalyst positioned in the first exhaust gas passageway to generate ammonia at least partially from urea injected into the first exhaust gas passageway by the urea injection system, and
an SCR catalyst downstream from the first and second exhaust gas passageways to reduce NOx with the generated ammonia.

2. The apparatus of claim 1, further comprising an exhaust gas valve operable to control flow of exhaust gas between the first and second exhaust gas passageways.

3. The apparatus of claim 2, further comprising a controller electrically coupled to the valve to control operation of the valve.

4. The apparatus of claim 3, further comprising an engine and at least one sensor, wherein the controller is configured to control operation of at least one of the urea injection system and the valve in response to at least one of an engine map associated with the engine and operation of the at least one sensor.

5. The apparatus of claim 1, further comprising a mixer positioned in the first exhaust gas passageway fluidly between the urea injection system and the hydrolysis catalyst.

6. The apparatus of claim 1, wherein each of the first exhaust gas passageway and the hydrolysis catalyst is annular so as to surround the second exhaust gas passageway.

7. The apparatus of claim 1, further comprising a first conduit and a second conduit, wherein:
the first and second conduits are secured to one another at upstream and downstream locations so as to extend outside one another between the upstream and downstream locations,
the first conduit defines the first exhaust gas passageway in which the hydrolysis catalyst is positioned, and
the second conduit defines the second exhaust gas passageway.

8. The apparatus of claim 1, wherein:
the urea injection system is not fluidly coupled to the second exhaust gas passageway, and
there is no hydrolysis catalysis in the second exhaust gas passageway.

9. The apparatus of claim 1, further comprising an engine, an exhaust gas supply passageway, and a downstream exhaust gas passageway, wherein:
the exhaust gas supply passageway is positioned fluidly between the engine and the first and second exhaust gas passageways to supply exhaust gas of the engine to the first and second exhaust gas passageways, and
the downstream exhaust gas passageway is fluidly coupled to and downstream from the first and second exhaust gas passageways and contains the SCR catalyst.

10. An apparatus, comprising:
an exhaust gas supply passageway dividing into first and second exhaust gas passageways to supply exhaust gas to the first and second exhaust gas passageways,
a urea injection system configured to inject urea into the first exhaust gas passageway,
a hydrolysis catalyst positioned in the first exhaust gas passageway to generate ammonia from urea injected into the first exhaust gas passageway by the urea injection system and from water present in the exhaust gas, and
an SCR catalyst that is positioned in a downstream exhaust gas passageway fluidly coupled to and downstream from the first exhaust gas passageway and that is configured to reduce NOx with ammonia received from the first exhaust gas passageway.

11. The apparatus of claim 10, wherein the first and second exhaust gas passageways are parallel so as to be fluidly coupled to and positioned fluidly between the exhaust gas supply passageway and the downstream exhaust gas passageway.

12. The apparatus of claim 10, including an exhaust gas valve operable to control flow of exhaust gas between the first and second exhaust gas passageways.

13. The apparatus of claim 10, including a mixer positioned in the first exhaust gas passageway fluidly between the urea injection system and the hydrolysis catalyst.

14. The apparatus of claim 10, wherein each of the first exhaust gas passageway and the hydrolysis catalyst is annular so as to surround the second exhaust gas passageway.

15. The apparatus of claim 14, including an exhaust gas valve operable to control flow of exhaust gas between the first and second exhaust gas passageways, and wherein the exhaust gas valve is positioned within the second exhaust gas passageway.

16. The apparatus of claim 15, including a housing having an inlet port that receives exhaust gas from the exhaust gas supply passageway and an outlet portion that discharges exhaust gas and ammonia to the downstream exhaust gas passageway, and including an inner tube that defines the second exhaust gas passageway with the first exhaust gas passageway being defined between an outer surface of the inner tube and an inner surface of the housing.

17. The apparatus of claim 16, wherein the urea injection system includes a urea dispenser secured to the housing and the inner tube.

18. The apparatus of claim 10, further comprising a first conduit and a second conduit, wherein:
the first and second conduits are secured to one another at upstream and downstream locations so as to extend outside one another between the upstream and downstream locations,
the first conduit defines the first exhaust gas passageway in which the hydrolysis catalyst is positioned, and
the second conduit defines the second exhaust gas passageway.

19. The apparatus of claim 10, wherein the first and second exhaust gas passageways recombine at a downstream location and then flow directly into the SCR catalyst.

20. The apparatus of claim 1, wherein the first and second exhaust gas passageways recombine at a downstream location and then flow directly into the SCR catalyst.

* * * * *